(12) United States Patent
Sawada

(10) Patent No.: US 6,504,681 B1
(45) Date of Patent: Jan. 7, 2003

(54) DAMAGE-REDUCED MAGNETIC HEAD

(75) Inventor: Shuichi Sawada, San Jose, CA (US)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/427,342

(22) Filed: Oct. 26, 1999

Related U.S. Application Data

(62) Division of application No. 08/940,902, filed on Sep. 30, 1997, now Pat. No. 5,997,755.

(51) Int. Cl.[7] .............................. G11B 5/60; G11B 15/64; B44C 1/22
(52) U.S. Cl. .............................. 360/235.6; 360/235.7; 360/236.3
(58) Field of Search .......................... 360/235.6, 235.7, 360/235.9, 236.3, 236.7, 235.5, 235.4, 236.4, 236.5, 236.6

(56) References Cited

U.S. PATENT DOCUMENTS

| | | | | |
|---|---|---|---|---|
| 4,951,165 A | * | 8/1990 | Makabe et al. | 360/246.2 |
| 4,998,174 A | * | 3/1991 | Wada et al. | 360/234.3 |
| 5,301,077 A | | 4/1994 | Yamaguchi et al. | 360/103 |
| 5,516,323 A | * | 5/1996 | Carlson et al. | 451/28 |
| 5,548,459 A | * | 8/1996 | Egawa et al. | 360/234.8 |
| 5,644,449 A | | 7/1997 | Hayakawa et al. | 360/103 |
| 5,853,959 A | | 12/1998 | Brand et al. | 430/320 |
| 5,872,686 A | * | 2/1999 | Dorius et al. | 360/236.3 |
| 5,923,499 A | * | 7/1999 | Hagen | 360/236.4 |
| 6,040,959 A | * | 3/2000 | Kobayashi et al. | 360/235.9 |
| 6,069,769 A | * | 5/2000 | Dorius et al. | 360/235.6 |
| 6,278,581 B1 | * | 8/2001 | Egawa et al. | 360/234.8 |

FOREIGN PATENT DOCUMENTS

| | | |
|---|---|---|
| JP | 62-159329 | 7/1987 |
| JP | 63-152015 | 6/1988 |
| JP | 63-152016 | 6/1988 |
| JP | 5-120825 | 5/1993 |

OTHER PUBLICATIONS

Anonymous, Slider with Cornered Air Bearing Surface, IBM Technical Disclosure Bulletin, vol. 37, No. 05, May 1994, pp. 577–578.*

* cited by examiner

*Primary Examiner*—David Hudspeth
*Assistant Examiner*—Angel Castro
(74) *Attorney, Agent, or Firm*—Dickstein, Shapiro, Morin & Oshinsky, LLP.

(57) ABSTRACT

Projected ABSs (air bearing surfaces) are formed on a disk facing plane of a slider. Three-dimensional corners constituting the corners of ABSs are chamfered. Two-dimensional corners constituting side edges of ABSs are not chamfered and has sharp edges. Damages of a disk surface and breakage of the slider are prevented when the slider collides with the disk surface by external shock.

17 Claims, 11 Drawing Sheets

DAMAGE-REDUCED MAGNETIC HEAD

This is a divisional of application of U.S. Ser. No. 08/940,902, filed Sep. 30, 1997 U.S. Pat. No. 5,997,755.

BACKGROUND OF THE INVENTION a) Field of the Invention

The present invention relates to a magnetic head slider and its manufacture, and more particularly to a magnetic head slider and its manufacture capable of preventing accidental breakage of the head and variation of the flying characteristics of a slider.

b) Description of the Related Art

As shown in FIG. 2A, a slider 10 having magnetic heads is supported by a suspension 12 over a magnetic disk 14 loaded in a hard disk drive. As the magnetic disk 14 rotates, the slider 10 flies over the disk 14 to record information in the disk 14 or reproduce it from the disk 14. If an external shock is applied to the flying slider 10, the position of the slider 10 changes.

As shown in FIG. 2B, if the slider 10 together with the suspension 12 jumps from up the disk 14 by external shock, it lands thereafter to onto the disk 14 by reaction as shown in FIG. 2C. In this case, the magnetic head slaps the surface of the disk 14. This head slap may cause damages of the disk surface or breakages of the slider.

In order to avoid surface damages of the disk 14 and breakages of the slider 10, a countermeasure as illustrated in FIGS. 3A and 3B has been used. FIG. 3A is a bottom view of a slider, and FIG. 3B is a cross sectional view taken along line IIIB—IIIB in FIG. 3A. Air bearing surfaces (ABSs) 18 and 20 of rails formed on a disk facing plane 16 of the slider are chamfered and rounded at their entire peripheries 28 to form chamfered portions 22. These chamfered portions 22 relax local impact to be applied to the surface of the disk 14 when head slap occurs, to thereby prevent surface damages of the disk 14 and breakages of the slider 10. In contrast outermost edges 29 of the slider 10 are not chamfered at all.

An edge blend method has been used as a method of forming chamfered portions. As shown in FIG. 4, an abrasive tape 24 is softly pushed against ABSs 18 and 20 of the slider 10 and the whole surfaces 28 of ABSs 18 and 20 are rubbed to form the chamfered portions 22.

SUMMARY OF THE INVENTION

It is an object of the present invention to provide a magnetic head slider capable of preventing damages of the disk surface and breakages of the slider to be caused when the slider slaps the disk surface by external shock, and of preventing variation of the flying characteristics of the slider.

It is another object of the present invention to provide a method of manufacturing a magnetic head slider capable of preventing electrostatic discharge damages (electrostatic breakage) of a magnetic head element and deterioration of the magnetic characteristics of magnetic material.

According to one aspect of the present invention, there is provided a magnetic head comprising: a) a slider having an air bearing surface (ABS) formed to project on a disk facing plane which is to confront a magnetic disk, wherein the slider having a second surface and the ABSs projecting from the second surface; and b) chamfered portions formed by chamfering three-dimensional corners constituting inner and outer corners of the ABSs and outer corners of the second surface of the slider, wherein two-dimensional corner lines constituting the side edges of the ABS and the second surface being remained non-chamfered.

According to another aspect of the present invention, there is provided a method of manufacturing a slider type magnetic head comprising: forming a projected air bearing surface (ABS) having an edge at its periphery, by etching a disk facing plane of a magnetic head slider, which is to confront a magnetic disk; coating on the disk facing plane with liquid resin and drying the coated resin, the resin thickness at three-dimensional corners constituting corners of the ABS being set thinner than other portions of the ABS; etching the resin by bombarding milling particles to the disk facing plane, etching the three-dimensional corners which is gradually exposed by the milling to chamfer the three-dimensional corners, and stopping bombarding the milling particles before two-dimensional corner lines constituting the side edges of the ABS are etched or before etching the two-dimensional corners progresses substantially; and a step of removing the resin left on the disk facing plane after said etching step.

Liquid resin can be coated on the disk facing plane having ABSs with a peripheral edge so that the resin film thickness becomes thin at the three-dimensional corners because of a balance of surface tension and dropping (gravity) of resin. In this state, milling particles are bombarded so that etching the three-dimensional corners can be progressed with a priority over the other portions to chamfer the three-dimensional corners. As being different from the process using an abrasive tape, this method does not use a rubbing process so that it is possible to prevent breakage of an magneto-resistance (MR) element and deterioration of the magnetic characteristics of magnetic material to be caused by electrostatic charge. This method is therefore applicable also to MR heads (inclusive of GMR heads).

If the coated liquid resin is heated, its fluidity increases and a difference of a resin film thickness between the three-dimensional corners and other portions can be made large. Therefore, only the three-dimensional corners can be reliably chamfered. If the etching is performed under the condition that the pole tip surface of a magnetic head element mounted on the slider is covered with the resin, it is possible to prevent the pole tip surface from being etched.

DETAILED DESCRIPTION OF THE PREFERRED EMBODIMENTS

Analysis of a conventional magnetic head will be given prior to the description of the embodiments of this invention.

Figure 3A:
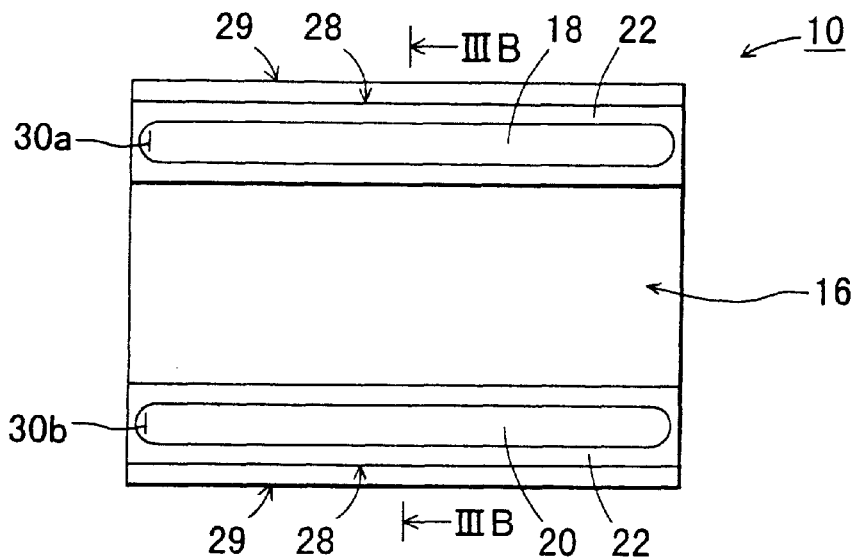
FIGS. 3A and 3B are a bottom view and a cross sectional view showing a conventional slider type magnetic head.
Figure 3B:
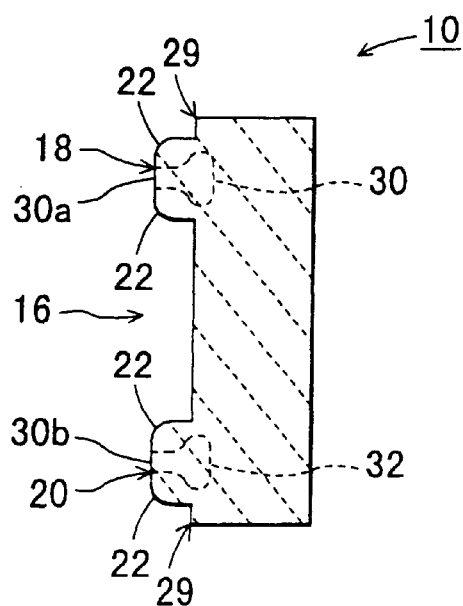

There is a conventional hard disk drive of the type that transports a slider in the disk radial direction by using a swing arm type head transport mechanism. An angle (skew angle) between a longitudinal direction of the slider and the track tangent direction varies depending upon the position of the slider in the disk radial direction. The flying slider with a skew angle is subject to inflow and outflow of flying air also on the side of the side peripheries of ABSs. Therefore, the edge shape of ABS side peripheries have significant influences upon the floating characteristics of the slider. For example, consider the structure of the slider 10 shown in FIGS. 3A and 3B in which the chamfered portions 22 are formed over the entire peripheries of ABSs 18 and 20. With this structure, it is difficult to form the chamfer portions 22 at high precision so that there is a difficulty in precisely controlling the flying characteristics (flying height, flying posture, and the like).

Figure 4:
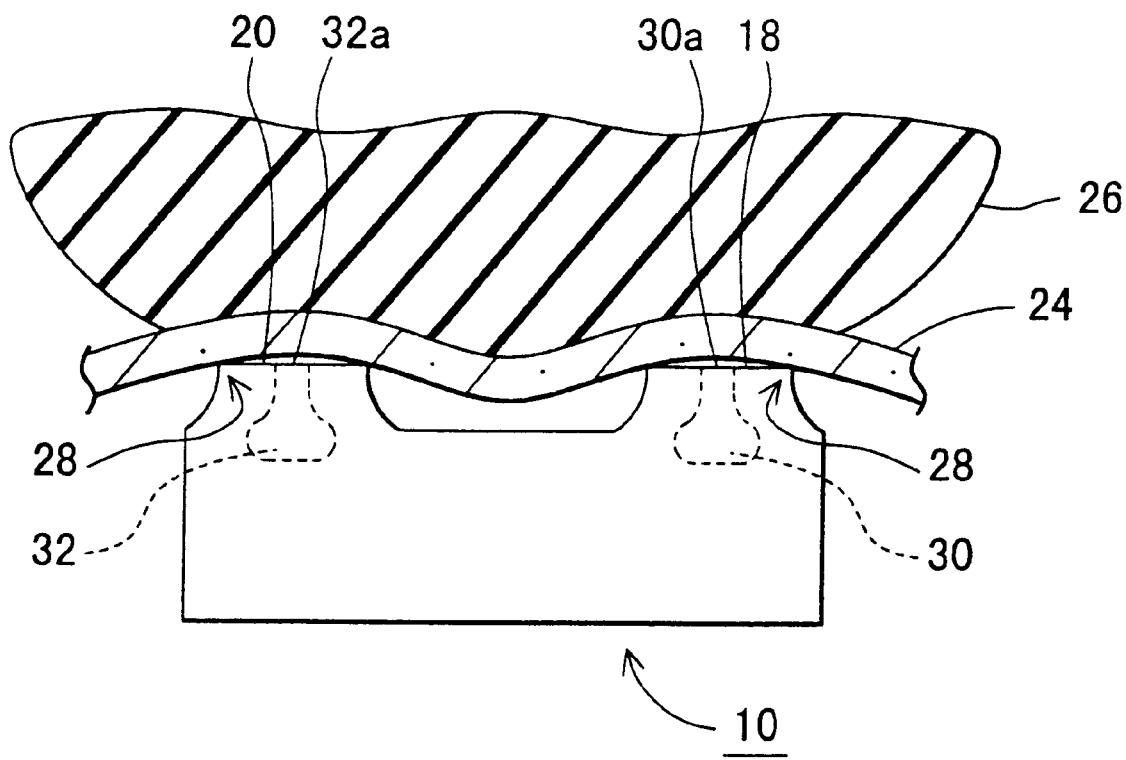
FIG. 4 is a schematic side view illustrating an edge blend method which forms the chamfered portions of the slider shown in FIGS. 2A to 2C.

The method of forming the chamfered portions 22 by using the abrasive tape 24 shown in FIG. 4 is not associated with any problem if the magnetic head elements 30 and 32 mounted on ABSs 18 and 20 are induction type thin film magnetic head elements. However, if an MR (magnetoresistive) type thin film magnetic transducer element is used, the element may undergo electrostatic discharge (ESD) damages by static electricity generated by the abrasive tape 24. The abrasive tape 24 may directly contact the pole tip surfaces 30a and 30b of the magnetic transducer elements 30 and 32, the pole tip surfaces being exposed on the surfaces of ABSs 18 and 20. In this case, irrespective of whether the thin film magnetic transducer elements are of an MR type or an induction type, the magnetic characteristics of magnetic material may be degraded by stress applied during the rubbing process using the abrasive tape.

Figure 5A:
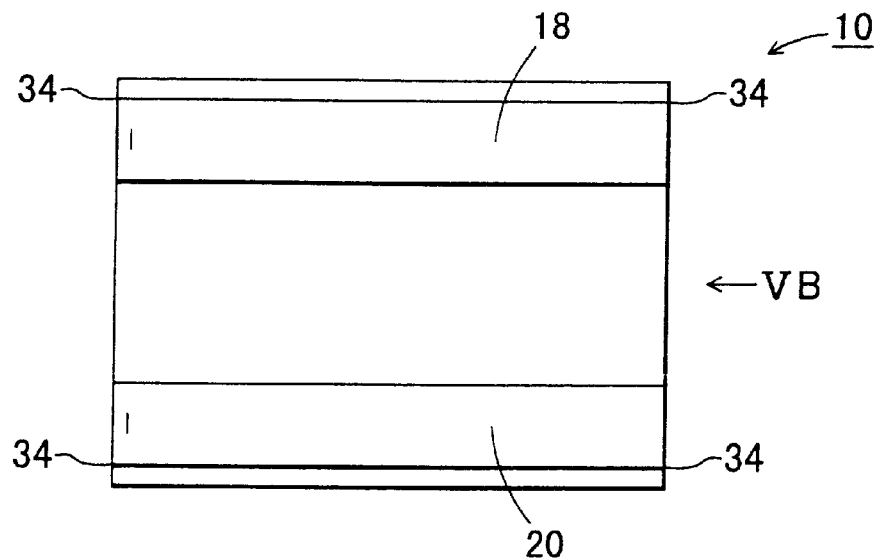
FIGS. 5A, 5B and 5C are a bottom view, a side view, and a perspective view of a slider type magnetic head illustrating analysis of head slap.
Figure 5B:
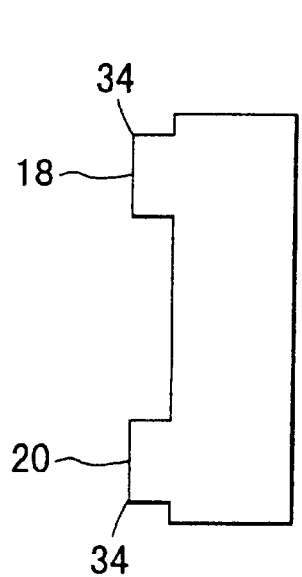
Figure 5C:
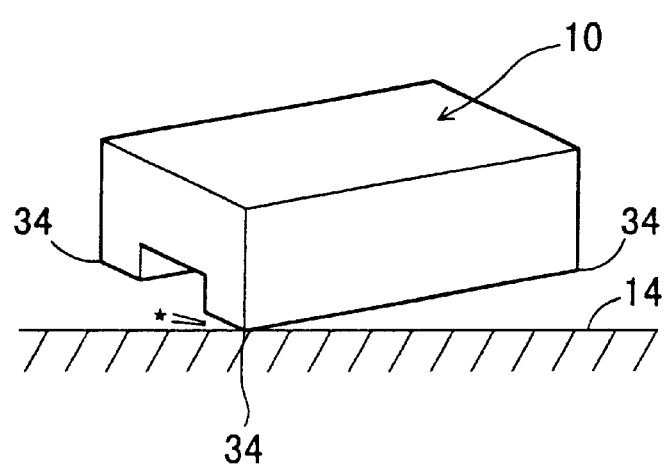

Upon rolling or pitching, a region of a slider which first contacts the disk surface when the slider slaps is one of three-dimensional corners 34 of ABSs 18 and 20 shown in FIG. 5A. The three dimensional corner 34 is a point defined by concentrating three lines along width, height and depth directions. FIG. 5B is a side view as seen along an arrow VB of FIG. 5A, and FIG. 5C shows a slider colliding with the disk. The three-dimensional corner 34 has a sharp edge. When this sharp edge slaps the disk, damages of the disk surface and breakage of this edge may occur.

By chamfering the three-dimensional corners at the outer sides of ABSs and outermost edges of the slider to form a facet, local shock applied to the disk surface when the slider slaps the disk is alleviated to prevent damages of the disk surface and breakage of the slider corner. The two-dimensional corner lines constituting the side edges of ABSs are made by meeting the ABS and a side surface of the rails to be generally free of chamfering to control the flying characteristics under a presence of a skew angle and to prevent a change in the flying characteristics.

If the two-dimensional corner lines constituting the front and back edges of ABSs are also made generally or completely free of chamfering, the flying characteristics can be controlled precisely. Depending upon the shape of ABSs, the three-dimensional corners at the inner side of ABS may lap the disk surface. Therefore, these corners are also chamfered. These structures are applicable to both positive and negative pressure type sliders. These structures are applicable to sliders having various types of magnetic head elements, such as MR type and induction type composite magnetic head elements, GMR (giant magnetoresistive) type and induction type composite magnetic head elements, and induction type magnetic head elements.

Figure 1A:
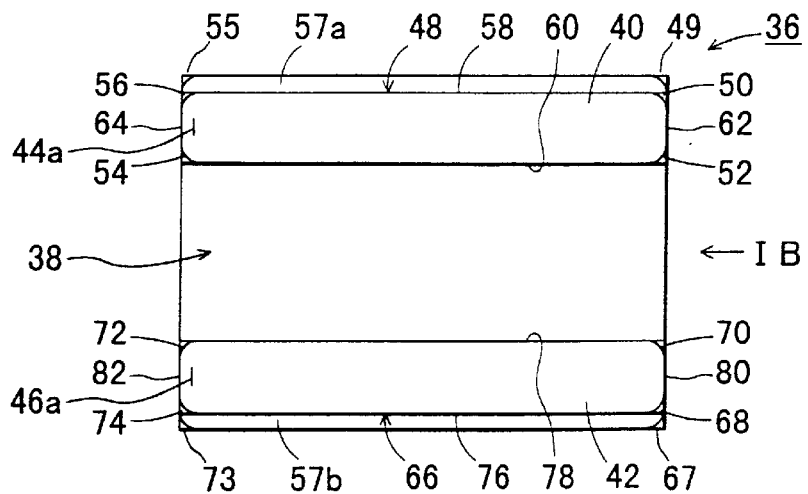
FIGS. 1A, 1B and 1C are a bottom view, a side view, and a perspective view of a slider type magnetic head according to an embodiment of the invention.
Figure 1B:
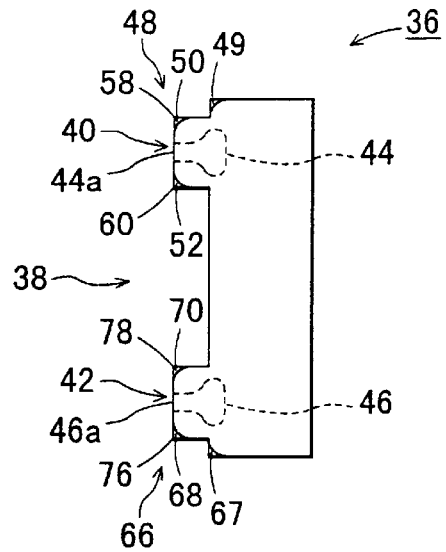
Figure 1C:
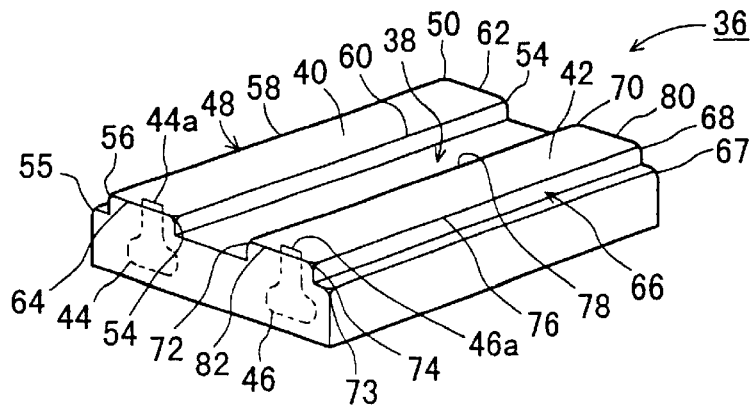
Figure 2A:
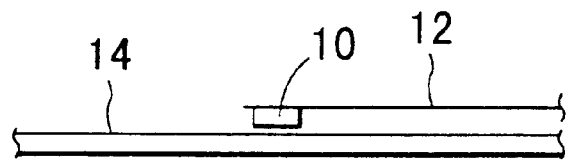
FIGS. 2A, 2B and 2C are schematic side views illustrating an example of head slap.
Figure 2B:
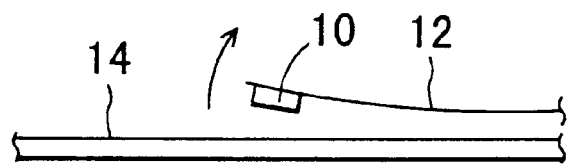
Figure 2C:
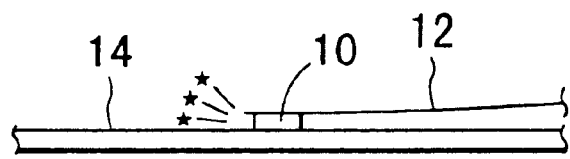

FIGS. 1A to 1C show a slider type magnetic head according to an embodiment of the invention. FIG. 1A is a bottom view, FIG. 1B is a side view as seen along an arrow IB, and FIG. 1C is a perspective view as seen along an arrow IC.

A slider 36 is made of material such as $Al_2O_3$—TiC. Protruding ABSs 40 and 42 of a rail-shape are linearly formed near at both sides (upper and lower sides in FIG. 1A) of a disk facing plane 38 of the slider 36. This slider is a catamaran type slider of a positive pressure type. The surfaces of ABSs 40 and 42 on the air inflow side may be tapered in some cases. Near the ends of ABSs 40 and 42 on the air outflow side, magnetic transducer elements 44 and 46 are embedded. The magnetic head elements 44 and 46 may be MR type and induction type composite thin film magnetic heads constituted of an induction type recording element and an MR type reproducing element (inclusive of GMR type). The pole tip surfaces 44a and 46a of the magnetic head elements 44 and 46 are exposed on the surfaces of ABSs 40 and 42.

Of the upper periphery 48 of ABS 40, three-dimensional corners 50, 52, 54, and 56 are chamfered and rounded in three-dimensional directions to form chamfered portions (facets). Of the upper periphery 48, two-dimensional corner lines 58 and 60 constituting the side edges (outer and inner side edges) are not chamfered (remains non-chamfered) but formed to have a sharp edge. Of the upper periphery 48, two-dimensional corner lines 62 and 64 constituting the front and back edges are also not chamfered (remains non-chamfered) but formed to have a sharp edge. Rails are projected from other places of the slider. As a result, second surfaces 57a and 57b, which have different level from the ABSs 40 and 42, are provided adjacent to side edges of ABSs 40 and 42.

The upper periphery 66 of ABS 42 is structured same as ABS 40. Namely, of the upper periphery 66 of ABS 42, three-dimensional corners 68, 70, 72, and 74 are chamfered and smoothly rounded in three-dimensional directions to form chamfered portions. Also, all of four corners 49, 55, 67 and 73 of the second surfaces of the slider 36 are chamfered. Of the upper periphery 66, two-dimensional corners 76 and 78 constituting the side edges (outer and inner side edges) are not chamfered but formed to have a sharp edge. Of the upper periphery 66, two-dimensional corners 80 and 82 constituting the front and back edges are not chamfered also but formed to have a sharp edge.

The three-dimensional corners 50, 56, 68, and 74 of the outer sides of ABSs 40 and 42 and the second surfaces of the slider 36 structured as above are chamfered to form facets. Therefore, even if these corners 50, 56, 68, and 74 collide with the disk surface at head slap, the corners 50, 56, 68 and 74 are brought into contact with the disk surface in a surface contact manner, shock to be locally applied to the disk surface can be alleviated so that it is possible to prevent damages of the disk surface and breakage of the three-dimensional corners 50, 56, 68, and 74 of the slider 36. In contrast, the corners are brought into contact with the disk surface in a point contact manner when not being faceted. Furthermore, since the two-dimensional corners 58, 60, 76, and 78 at the side edges of ABSs 40 and 42 are not chamfered but formed to have a sharp edge, the flying characteristics of the slider 36 with a skew angle can be controlled precisely. The two-dimensional corner lines 62, 80, 64, and 82 at the front and back edges of ABSs 40 and 42 are also not chamfered but formed to have a sharp edge. Therefore, the flying characteristics of the slider 36 can be controlled precisely.

An example of the manufacture processes for the slider 36 shown in FIGS. 1A to 1C will be described with reference to FIGS. 6AA to 6E.

(1) ABS Process

Figure 6A:
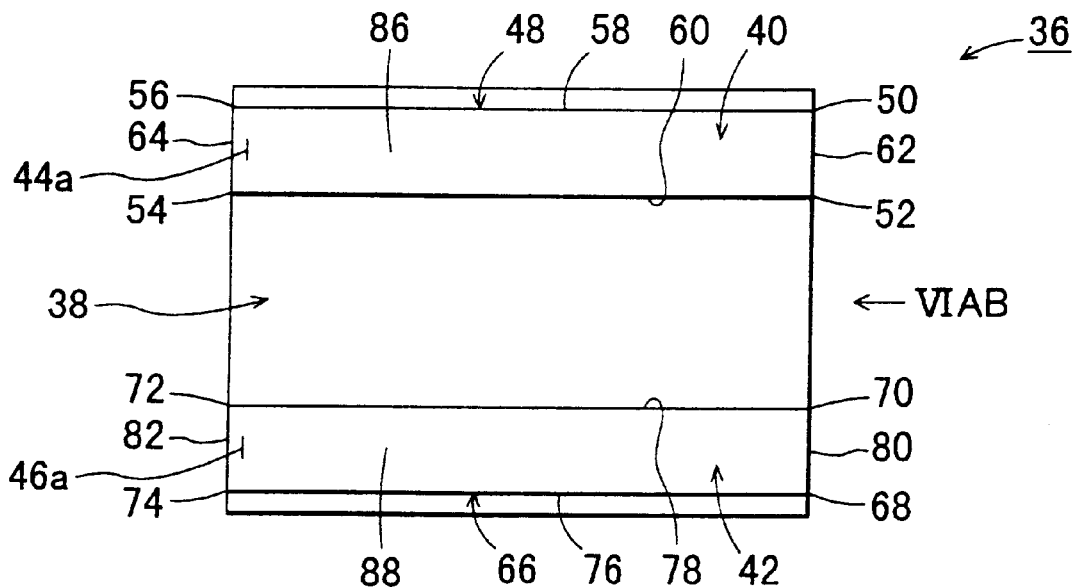
FIGS. 6AA to 6I are a bottom view, a side view, cross sectional views, a schematic view, and perspective views illustrating the manufacture processes for the slider shown in FIGS. 1A to 1C.
Figure 6A:
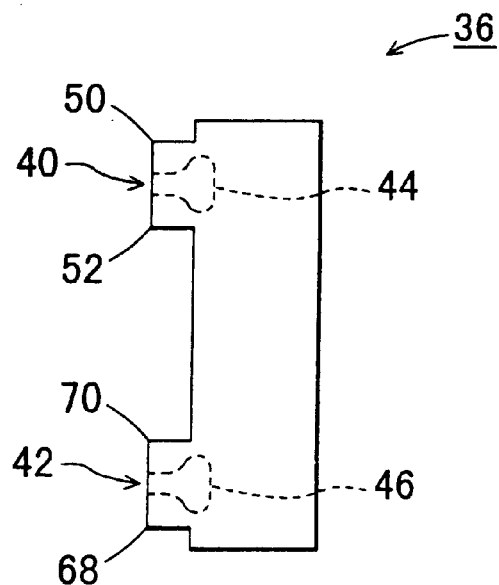

FIGS. 6AA and 6AB are a bottom view and a side view of a slider after the ABS process. A substrate in a row-bar stage before it is cut into each slider 36 or a cut slider 36 is prepared. The slider 36 is worked to form ABSs 40 and 42 of a predetermined size on a disk facing plane 38, by usual mechanical cutting or ion milling. After this cutting or milling, the peripheries 48 and 66 of ABSs 40 and 42 have sharp edges cut upright, and the three-dimensional corners 50, 52, 54, 56, 68, 70, 72, and 74 are sharp pointed corners.

(2) Resin Coating

Figure 6B:
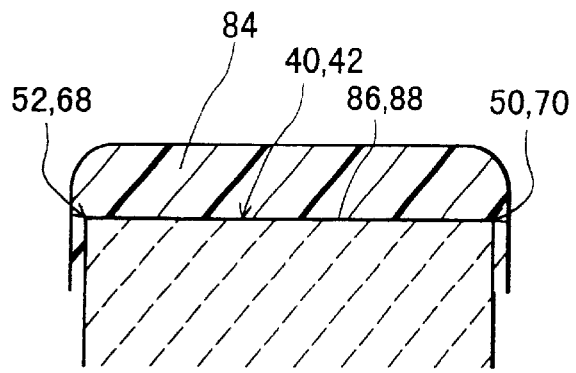

FIG. 6B is a cross sectional view of a resin coated slider. The slider 36 is supported horizontally with the disk facing plane 38 being directed upward. Polymer resin or its solution is coated uniformly on the whole surface of the disk facing plane 38 by means of spraying, spin coating, dip coating, or the like, and thereafter the resin is dried. Polymer resin may be selected from various kinds of polymer materials such as novolak resin used for photoresist and acrylic resin. The resin thickness at the peripheries 48 and 66 is thinner than that at the flat areas 86 and 88 of ABSs 40 and 42, because of dropping of resin solution from the peripheries by gravity and a balance of surface tension of resin solution. The three-dimensional corners 50, 52, 54, 56, 68, 70, 72, and 74 in particular have a resin thickness thinner than that of the two-dimensional corner lines 58, 60, 62, 64, 76, 78, 80, and 82. Also, the resin thickness at the four corners 49, 55, 67 and 73 of the second surfaces of the slider 36 is thinner than that at the two-dimensional corner lines of the outermost lines of the slider 36. The pole tip surfaces 44a and 46a of the magnetic head elements 44 and 46 are sufficiently covered with the resin 84.

(3) Fluidizing Through Heating

Figure 6C:
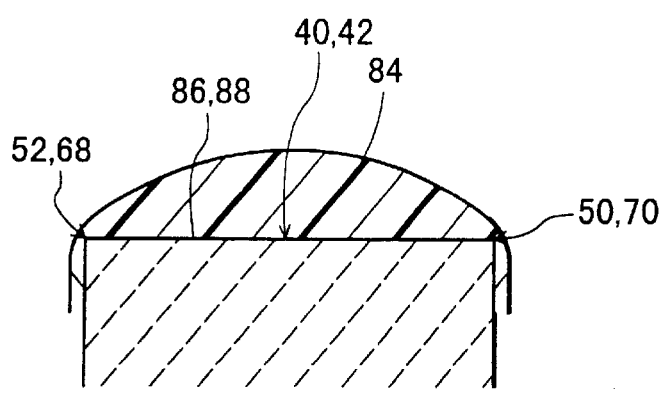
Figure 6C:
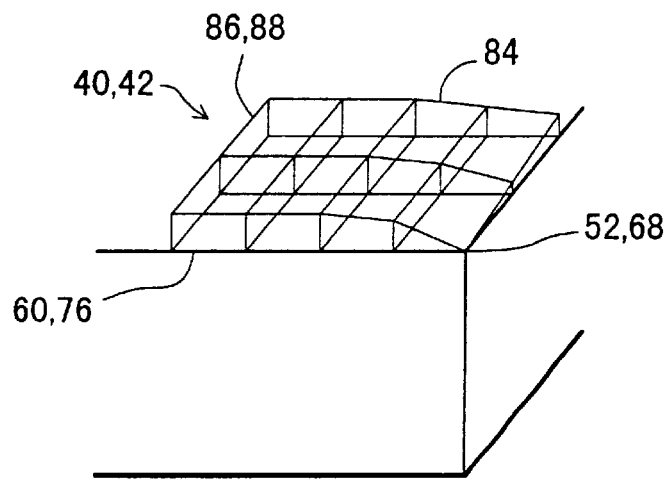

FIGS. 6CA and 6CB are a cross sectional view and a schematic diagram of the slider with the fluidized resin film. After or before the resin 84 is dried, it is heated to soften it. Resist becomes soft at about 150° C. The softened resin 84 is further pulled by its surface tension. Therefore, the resin on the flat portions 86 and 88 of ABSs 40 and 42 become more thicker, and the resin on the peripheries 48 and 66 become more thinner before heating and softening. The resin at the three-dimensional corners 49, 50, 52, 54, 55, 56, 67, 68, 70, 72, 73, and 74 in particular become thinnest. By controlling the process conditions, the three-dimensional corners 49, 50, 52, 54, 55, 56, 67, 68, 70, 72, 73, and 74 are almost exposed at their sharp pointed corners.

(4) Ion Milling

Figure 6D:
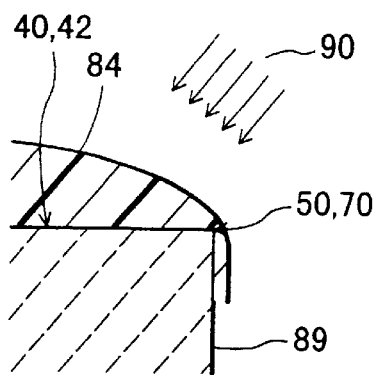
Figure 6F:
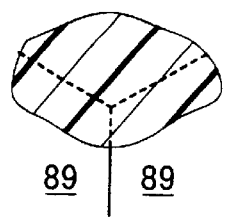
Figure 6D:
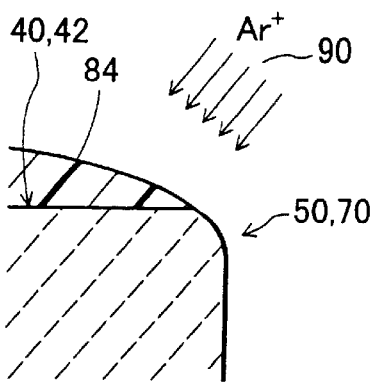
Figure 6G:
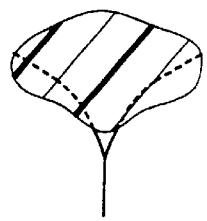
Figure 6D:
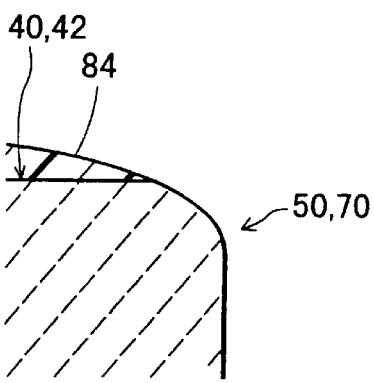
Figure 6H:
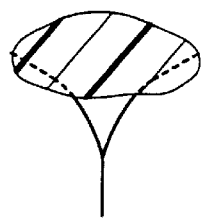

FIGS. 6DA, 6DB, and 6DC are cross sectional views and FIGS. 6F, 6G and 6H are perspective views of the slider illustrating the ion milling process. As shown in FIGS. 6DA and 6F, milling ions 90 such as Ar are bombarded down to the disk facing plane 38 to etch the solidified resin 84 through ion milling. The angle of bombarding milling ions 90 may be 0°, 30°, 45°, or 60° relative to the disk facing plane 38.

As shown in FIGS. 6DB and 6G, as the etching starts, the resin 84 at the three-dimensional corners 49, 50, 52, 54, 55, 56, 67, 68, 70, 72, 73 and 74 having a thinnest resin film thickness and on side walls 89 is removed and thereafter the slider substrate constituting these three-dimensional corners is slightly etched.

As shown in FIGS. 6DC and 6H, as the etching progresses and the resin film thickness becomes thinner, the areas of the etched slider substrate increase. In this manner chamfering is performed to form facets. Etching is stopped before the two-dimensional corners 58, 60, 62, 64, 76, 78, 80, and 82 of ABSs 40 and 42 and the two-dimensional corner lines of the outermost lines of the slider 36 are exposed or before the etching further progresses even if they are exposed slightly. The two-dimensional corner lines constituting the side edges are controlled so as not to be etched substantially. For example, the width of the chamfered portions of the two-dimensional corners is controlled to be one hundred-th of the width of the ABS.

(5) Removing Resin

Figure 6E:
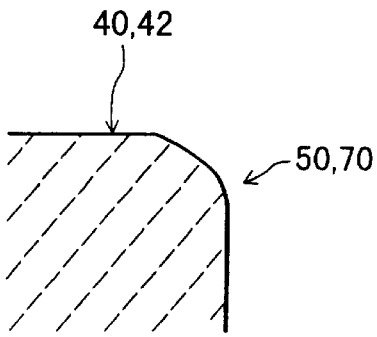
Figure 6I:
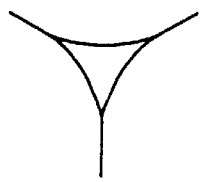

FIG. 6E is a cross sectional view and FIG. 6I is a perspective view of the slider after the resin removing process. The resin 84 left on the disk facing plane 38 is removed and washed by solvent.

The above manufacture method provides the following advantageous effects.

(a) All of the sharp pointed corners of the three-dimensional corners 49, 50, 52, 54, 55, 56, 67, 68, 70, 72, 73, and 74 which may cause damages of the disk surface at head slap can be efficiently chamfered.

(b) Chamfering is not performed or it can be minimized for the two-dimensional corner lines 58, 60, 62, 64, 76, 78, 80 and 82 constituting the side edges of ABSs 40 and 42 which adversely affect the flying profile of the slider. Accordingly, the flying profile can be maintained stable.

(c) Since a rubbing process is not used, ESD damages by static electricity is less and this method is applicable also to MR heads.

(d) Since the pole tip surfaces 44a and 46a of the magnetic transducer elements 44 and 46 are protected by the resin 84 during etching, it is possible to prevent the pole tip surfaces 44a and 46a from being etched.

In the above embodiment, a catamaran type slider is used by way of example. The above method is applicable to sliders of other types. Three examples of other types are shown in FIGS. 7A to 9B. Sliders shown in FIGS. 7A and 7B, FIGS. 8A and 8B, and FIGS. 9A and 9B have chamfered portions at the three-dimensional corners formed by the processes illustrated in FIGS. 6AA to 6E.

Figure 7A:
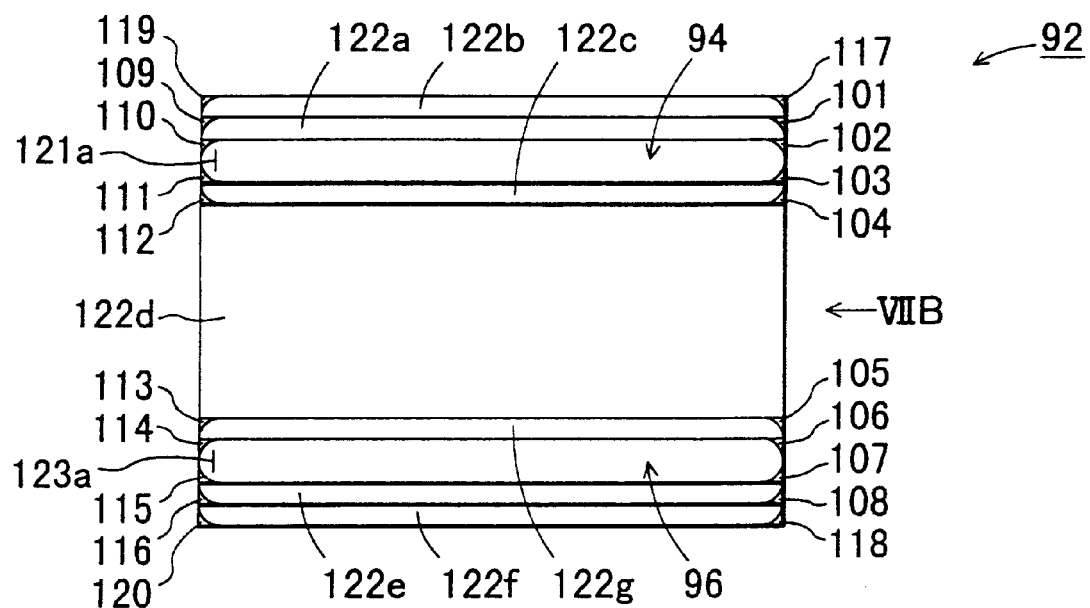
FIGS. 7A and 7B are a bottom view and a side view of a slider type magnetic head according to another embodiment of the invention.
Figure 7B:
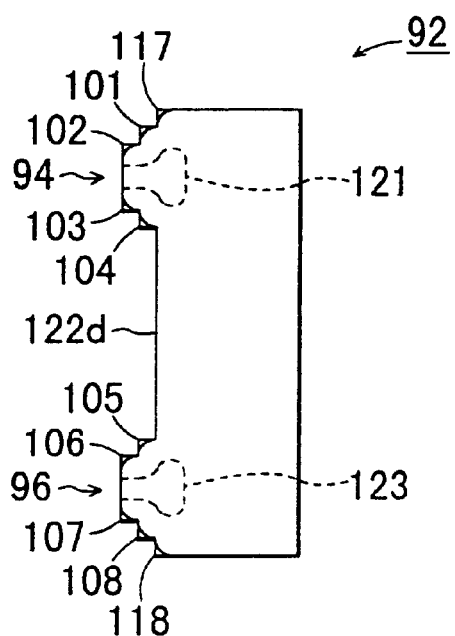

FIGS. 7A and 7B are a bottom view and a side view of a transverse pressure control (TPC) type slider 92 of a positive pressure type. Two steps are formed on the side walls of ABSs 94 and 96. Therefore, third surfaces 122a, 122c, 122e and 122g, which recede from the ABSs 94 and 96 with respect to the disk surface, are provided at both sides of the ABSs 94 and 96. Fourth surfaces 122b, 122d, 122f and 122g, which further recede from the third surface 122a, 122c, 122e and 122g, are provided at both sides of the third surfaces 122a, 122c, 122e and 122g, respectively. The pole tip surfaces 121a and 123a of magnetic head elements 121 and 123 are exposed near the highest step edge of ABSs 94 and 96. The three-dimensional corners 101 to 116 at each step and the three-dimensional corners 117 to 120 at the four corners of the slider 92 are all chamfered. Only the three-dimensional corners 102, 107, 110, and 115 at the highest step of ABSs 94 and 96 on the outer side may be selectively chamfered.

Figure 8A:
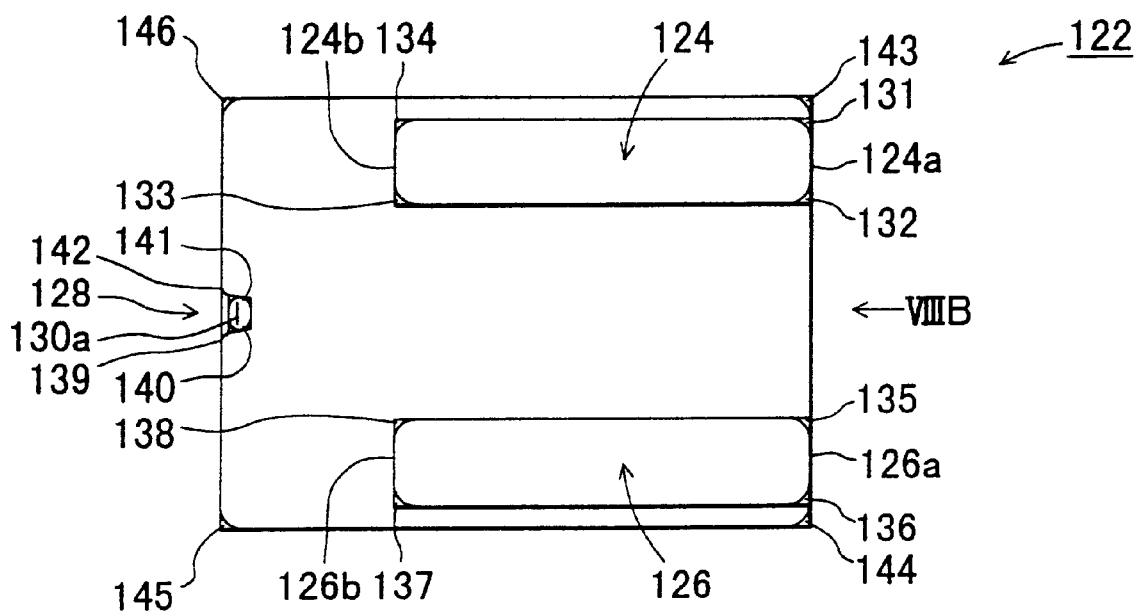
FIGS. 8A and 8B are a bottom view and a side view of a slider type magnetic head according to a further embodiment of the invention.
Figure 8B:
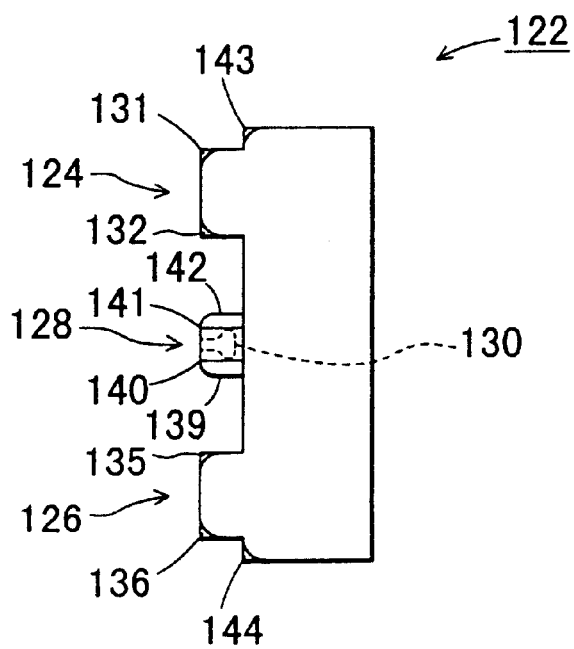

FIGS. 8A and 8B are a bottom view and a side view of a tri-pad type slider 122 of a positive pressure type. Although ABSs 124 and 126 on the side of air inflow edges 124a and 126a reach the front edge of the slider 122, ABSs 124 and 126 on the side of air outflow edges 124b and 126b are cut at the intermediate positions of the slider 122. ABS 128 of a small projection is formed near the back edge of the slider 122 at the center in the width direction. A magnetic head element 130 is embedded in this ABS 128. The pole tip surface 130a of the magnetic head 130 is exposed on the surface of ABS 128.

The three-dimensional corners 131 to 142 of ABSs 124, 126, and 128 and the three-dimensional corners 143 to 146 at the four corners of the slider 122 are all chamfered. Only the three-dimensional corners 131, 134, 136, and 137 at the outer sides of ABSs 124 and 126, the three-dimensional corners 145 and 146 at the back edges of the slider 122, and the three-dimensional corners 139 and 142 at the back edge of ABS 128 may be selectively chamfered.

Figure 9A:
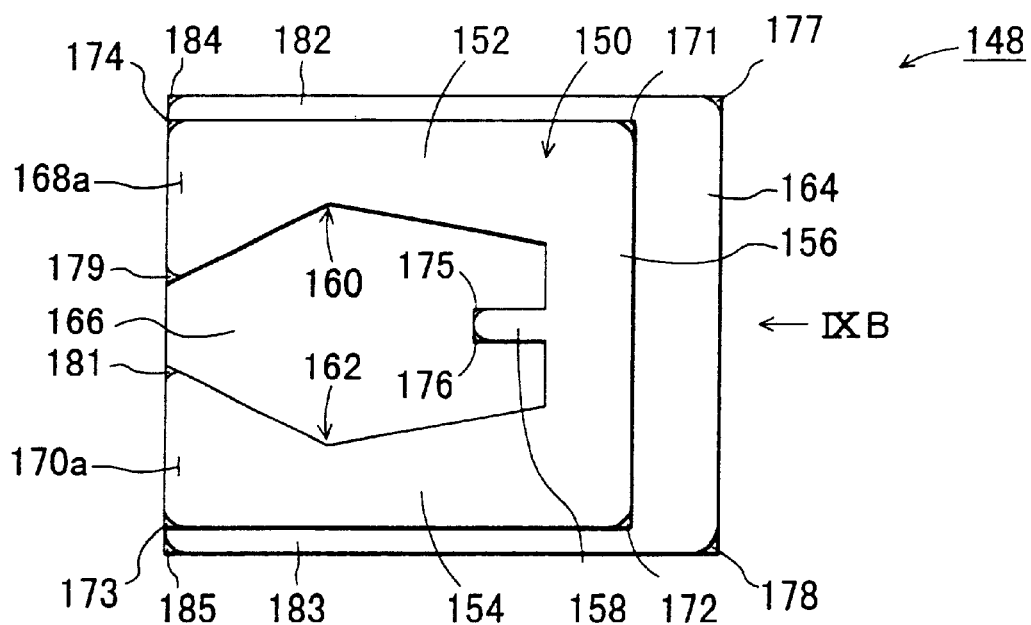
FIGS. 9A and 9B are a bottom view and a side view of a slider type magnetic head according to another embodiment of the invention.
Figure 9B:
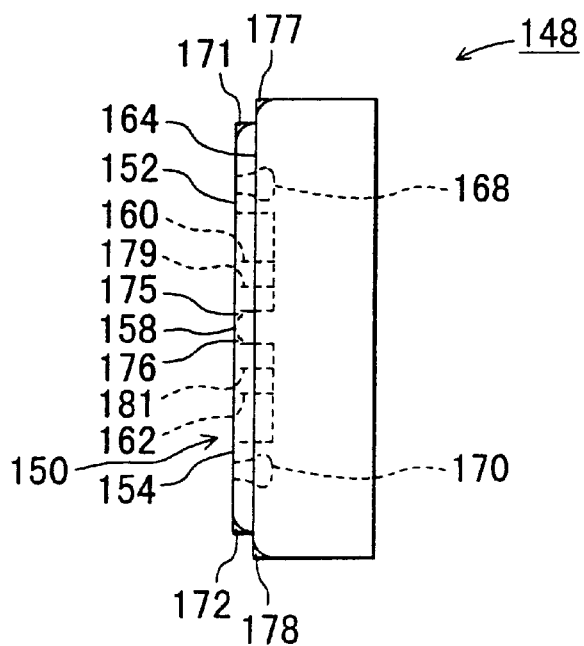

FIGS. 9A and 9B are a bottom view and a side view of a slider 148 of a negative pressure type. ABS 150 is constituted of right and left side rails 154 and 152, a cross rail 156 interconnecting the end portions of the side rails 154 and 152, and a center rail 158 extending from the middle of the cross rail 156 in the width direction toward the downstream by a predetermined length. Recesses 160 and 162 are formed at the inner side walls of the side rails 152 and 154. A portion 164 upstream of the cross rail 156 has a middle height lower than ABS 150 and higher than a concave 166 surrounded by ABS 150. Side portions 182 and 183, which has the same height level as the portion 164, also extend along the right and left side rails 154 and 152. Magnetic head elements 168 and 170 are embedded in side rails 152 and 154 near the back edges thereof. The pole tip surfaces 168a and 170a of the magnetic heads are exposed on the surfaces of the side rails 152 and 154.

The three-dimensional corners 171 to 176, 179 and 181 of ABS 150 and the three-dimensional corners 177, 178, 184 and 185 of the slider 148 at the right and left front edge corners are all chamfered.

The present invention has been described in connection with the preferred embodiments. The invention is not limited only to the above embodiments. It is apparent that various modifications, improvements, combinations, and the like can be made by those skilled in the art.

What is claimed is:

1. A magnetic head comprising:
   a) a slider having an air bearing surface (ABS) formed to project on a disk facing plane which is to confront a magnetic disk, wherein the slider having a second surface and the ABSs projecting from the second surface; and
   b) chamfered portions formed by chamfering three-dimensional corners constituting inner and outer corners of the ABS and outer corners of the second surface of the slider, wherein two-dimensional corner lines constituting the side edges of the ABS and the second surface being remained non-chamfered.

2. A magnetic head according to claim 1, wherein the chamfered portions have a smooth curve surface.

3. A magnetic head according to claim 1, wherein two-dimensional corners constituting the front and back edges of the ABS and second surface are not substantially chamfered.

4. A magnetic head according to claim 1, wherein the two dimensional corner lines extend along the longitudinal direction of the slider.

5. A magnetic head according to claim 1, further comprising an MR type and induction type composite thin film magnetic head element mounted on the slider.

6. A magnetic head according to claim 1, wherein the slider has a shape generating a positive pressure.

7. A magnetic head according to claim 1, wherein the slider has a shape generating a negative pressure.

8. A magnetic head structure according to claim 1, wherein the slider includes a third surface which is lower than the second surface with respect to the disk surface; outer corners of the third surface of the slider is chamfered; and two dimensional corner lines constituting the side edges of the third surface are remained non-chamfered.

9. A magnetic head structure according to claim 8, wherein the slider includes a fourth surface which is lower than the third surface with respect to the disk surface; outer corners of the fourth surface of the slider is chamfered; and two dimensional corner lines constituting the side edges of the fourth surface are remained non-chamfered.

10. A magnetic head structure according to claim 1, wherein the slider includes a third surface which is lower than the second surface with respect to the disk surface; outer corners of the third surface of the slider is chamfered; and two dimensional corner lines constituting the side edges of the third surface are remained non-chamfered.

11. A magnetic head structure according to claim 10, wherein the slider includes a fourth surface which is lower than the third surface with respect to the disk surface; outer corners of the fourth surface of the slider is chamfered; and two dimensional corner lines constituting the side edges of the fourth surface are remained non-chamfered.

12. A magnetic head structure comprising:
   a) a magnetic transducer element; and
   b) a slider retaining the magnetic transducer element and having an air bearing surface (ABS) and a second surface to face a magnetic disk, wherein the ABSs projecting from the second surface;
   said all of three-dimensional corners of the ABSs and second surface of the slider being chamfered and wherein outer edges of the ABSs and the second surface along the longitudinal direction of the slider being remained non-chamfered.

13. A magnetic head structure according to claim 12, wherein the chamfered portions have a smooth curve surface.

14. A magnetic head according to claim 12, wherein the outer edges constituting the front and back edges of the ABS and second surface are not substantially chamfered.

15. A magnetic head according to claim 12, wherein the magnetic transducer element is a composite type of an MR type and induction type head element.

16. A magnetic head according to claim 12, wherein the slider has a shape generating a positive pressure.

17. A magnetic head according to claim 12, wherein the slider has a shape generating a negative pressure.

* * * * *